US010355963B2

(12) United States Patent
Deng et al.

(10) Patent No.: US 10,355,963 B2
(45) Date of Patent: Jul. 16, 2019

(54) HEARTBEAT PERIOD SETTING METHOD, AND TERMINAL

(71) Applicant: Huawei Technologies Co., Ltd., Shenzhen (CN)

(72) Inventors: Yu Deng, Shanghai (CN); Qilin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/523,259

(22) PCT Filed: Oct. 29, 2014

(86) PCT No.: PCT/CN2014/089787
§ 371 (c)(1),
(2) Date: Apr. 28, 2017

(87) PCT Pub. No.: WO2016/065552
PCT Pub. Date: May 6, 2016

(65) Prior Publication Data
US 2017/0317910 A1 Nov. 2, 2017

(51) Int. Cl.
*H04L 12/26* (2006.01)
*H04L 29/08* (2006.01)
(52) U.S. Cl.
CPC .............. *H04L 43/10* (2013.01); *H04L 43/16* (2013.01); *H04L 43/50* (2013.01); *H04L 67/145* (2013.01); *Y02D 30/40* (2018.01)
(58) Field of Classification Search
CPC .............. G06F 11/2097; G06F 11/263; G06F 11/3428; G06F 11/3664; G06F 11/3668;
(Continued)

(56) References Cited

U.S. PATENT DOCUMENTS 6,002,868 A * 12/1999 Jenkins ................ G06F 11/263
702/118
8,966,318 B1 * 2/2015 Shah .................... G06F 11/3664
714/28
(Continued)

FOREIGN PATENT DOCUMENTS

CN           1661968 A      8/2005
CN        101594268 A     12/2009
(Continued)

*Primary Examiner* — Le H Luu
(74) *Attorney, Agent, or Firm* — Leydig, Voit & Mayer, Ltd.

(57) ABSTRACT

Embodiments of the present invention disclose a heartbeat period setting method, including: setting a heartbeat period of a tested application to T2 and performing a first heartbeat test; setting heartbeat periods of multiple applications to T1 if the first heartbeat test is not passed, and performing heartbeat services; or setting the heartbeat period of the tested application to T3 if the first heartbeat test is passed, and performing a second heartbeat test; and setting the heartbeat periods of the multiple applications to T2 if the second heartbeat test is not passed, and performing heartbeat services; or setting the heartbeat period of the tested application to T4 if the second heartbeat test is passed, and performing a third heartbeat test, where T1<T2<T3<T4. The embodiments of the present invention further disclose a corresponding mobile terminal. According to the heartbeat period setting method and the terminal in the embodiments of the present invention, applications perform heartbeat services at a same moment by using a same heartbeat period, so that energy consumption of the terminal and signaling overheads are effectively reduced, and a load on an application server can further be reduced.

15 Claims, 6 Drawing Sheets

(58) Field of Classification Search
CPC ... G06F 11/3684; G06F 11/368; G06Q 40/04; G08B 25/007; H04L 43/00; H04L 43/10; H04L 43/16; H04L 43/50; H04L 67/145; H04M 15/00; Y02D 30/40
See application file for complete search history.

(56) References Cited

U.S. PATENT DOCUMENTS

| | | | |
|---|---|---|---|
| 2002/0083213 A1* | 6/2002 | Oberstein | G06F 11/3684 719/313 |
| 2004/0199815 A1* | 10/2004 | Dinker | G06F 11/3428 714/21 |
| 2004/0221013 A1* | 11/2004 | Timbadia | H04L 43/00 709/206 |
| 2005/0071470 A1* | 3/2005 | O'Brien | G06F 11/2097 709/226 |
| 2007/0214256 A1 | 9/2007 | Castaneda et al. | |
| 2007/0299962 A1* | 12/2007 | Budzisch | G06F 11/3668 709/224 |
| 2008/0165796 A1 | 7/2008 | Martinez et al. | |
| 2009/0273463 A1* | 11/2009 | Morwood | G08B 25/007 340/514 |
| 2012/0221955 A1* | 8/2012 | Raleigh | H04M 15/00 715/736 |
| 2013/0152047 A1* | 6/2013 | Moorthi | G06F 11/368 717/124 |
| 2014/0066063 A1 | 3/2014 | Park | |
| 2015/0370674 A1* | 12/2015 | Lazar | G06F 11/263 705/14.1 |
| 2016/0078538 A1* | 3/2016 | Katsuyama | G06Q 40/04 705/37 |

FOREIGN PATENT DOCUMENTS

| | | |
|---|---|---|
| CN | 101697554 A | 4/2010 |
| CN | 102843250 A | 12/2012 |
| CN | 103139008 A | 6/2013 |
| CN | 103905257 A | 7/2014 |
| EP | 2242206 A2 | 10/2010 |

* cited by examiner

HEARTBEAT PERIOD SETTING METHOD, AND TERMINAL

CROSS-REFERENCE TO RELATED APPLICATIONS

This application is a national stage of International Application No. PCT/CN2014/089787, filed on Oct. 29, 2014, which is hereby incorporated by reference in its entirety.

TECHNICAL FIELD

The embodiments of the present invention pertain to the field of communications technologies, and in particular, to a heartbeat period setting method.

BACKGROUND

Referring to FIG. 1, a persistent connection is established between an application installed on a terminal and a remote application server by using a network. If there is no data communication over the persistent connection in a specific time period, a core network disconnects the persistent connection. Therefore, the application needs to maintain the persistent connection to the application server by using a heartbeat mechanism. The heartbeat mechanism is periodical transmission of a heartbeat packet between a terminal and a server, so as to ensure a normal persistent connection. For example, the terminal sends a heartbeat packet to the server at a regular interval. If the server responds to the heartbeat packet in a specific time period, it indicates that the terminal is normally connected to the server. If the server does not respond to the heartbeat packet in a specific time period, it indicates that the terminal is disconnected from the server. After the disconnection is learned, remedial actions, such as fault detection and reconnection, may be used. Alternatively, a heartbeat service may be implemented in a manner in which the server actively sends a heartbeat packet to the terminal, or in another manner.

The application generally has a preset heartbeat period to meet a need of a current application service. If applications on the terminal have different heartbeat start points and periods, the terminal needs to wake up a modem of the terminal for multiple times at different time points to establish a Radio Resource Control (RRC) connection to a base station, and send a single heartbeat packet to each application server, which results in relatively huge energy consumption and a relatively great waste of signaling.

If all applications perform heartbeat services by using a same heartbeat period, multiple heartbeat packets may be sent by using one RRC connection, so that the energy consumption and the waste of signaling are effectively reduced. However, how to determine a proper heartbeat period is a problem to be urgently resolved. If an excessively short heartbeat period is set, the heartbeat service is frequently performed, and consumption of energy and signaling is relatively huge. If an excessively great heartbeat period is set, the heartbeat period may exceed a heartbeat period threshold of the application server or the core network, which causes a disconnection, and an interruption of the heartbeat service.

SUMMARY

Embodiments of the present invention provide a heartbeat period setting method to set a same heartbeat period for applications on a terminal.

According to a first aspect, an embodiment of the present invention provides a heartbeat period setting method, including:

setting a heartbeat period of a tested application to T2 and performing a first heartbeat test;

setting heartbeat periods of multiple applications to T1 if the first heartbeat test is not passed, and performing heartbeat services; or setting the heartbeat period of the tested application to T3 if the first heartbeat test is passed, and performing a second heartbeat test; and setting the heartbeat periods of the multiple applications to T2 if the second heartbeat test is not passed, and performing heartbeat services; or setting the heartbeat period of the tested application to T4 if the second heartbeat test is passed, and performing a third heartbeat test, where $T1<T2<T3<T4$.

In a first possible implementation manner of the first aspect, T1 is a minimum heartbeat period of preset heartbeat periods of the tested application and the multiple applications.

With reference to the first aspect or the first possible implementation manner of the first aspect, in a second possible implementation manner, the setting the heartbeat period of the tested application to T3 if the first heartbeat test is passed, and performing a second heartbeat test includes: setting the heartbeat periods of the multiple applications to T2 if the first heartbeat test is passed, and performing a first overall heartbeat test; and setting the heartbeat period of the tested application to T3 if the first overall heartbeat test is passed, and performing the second heartbeat test.

With reference to the second possible implementation manner of the first aspect, in a third possible implementation manner, if the first overall heartbeat test is not passed, the heartbeat periods of the multiple applications are set to T1 and heartbeat services are performed.

With reference to the first aspect or the first to the third possible implementation manners of the first aspect, in a fourth possible implementation manner, the setting the heartbeat period of the tested application to T4 if the second heartbeat test is passed, and performing a third heartbeat test includes: setting the heartbeat periods of the multiple applications to T3 if the second heartbeat test is passed, and performing a second overall heartbeat test; and setting the heartbeat period of the tested application to T4 if the second overall heartbeat test is passed, and performing the third heartbeat test.

With reference to the fourth possible implementation manner of the first aspect, in a fifth possible implementation manner, if the second overall heartbeat test is not passed, the heartbeat periods of the multiple applications are set to T2 and heartbeat services are performed.

With reference to the first aspect or the first to the fifth possible implementation manners of the first aspect, in a sixth possible implementation manner, $T2=T1+\Delta t$; $T3=T2+\Delta t$; and $T4=T3+\Delta t$, where $\Delta t$ is a time constant.

With reference to the first aspect or the first to the sixth possible implementation manners of the first aspect, in a seventh possible implementation manner, the first heartbeat test includes: periodically sending, by a terminal, a heartbeat packet to a tested application server by using T2 as a period to test whether the tested application server normally responds to the heartbeat packet.

With reference to the second to the seventh possible implementation manners of the first aspect, in an eighth possible implementation manner, the first overall heartbeat test includes: periodically sending, by the terminal, heartbeat packets to multiple application servers by using T2 as a period to test whether the multiple application servers normally respond to the heartbeat packets.

With reference to the first aspect or the first to the eighth possible implementation manners of the first aspect, in a ninth possible implementation manner, the method further includes: recording the heartbeat periods that are of the multiple applications and set in a current network.

According to a second aspect, an embodiment of the present invention provides a terminal, including:

a first test unit, configured to set a heartbeat period of a tested application to T2 and perform a first heartbeat test;

a first heartbeat service unit, configured to: set heartbeat periods of multiple applications to T1 if the first heartbeat test is not passed, and perform heartbeat services;

a second test unit, configured to: set the heartbeat period of the tested application to T3 if the first heartbeat test is passed, and perform a second heartbeat test;

a second heartbeat service unit, configured to: set the heartbeat periods of the multiple applications to T2 if the second heartbeat test is not passed, and perform heartbeat services; and a third test unit, configured to: set the heartbeat period of the tested application to T4 if the second heartbeat test is passed, and perform a third heartbeat test, where $$T1<T2<T3<T4.$$

In a first possible implementation manner of the second aspect, T1 is a minimum heartbeat period of preset heartbeat periods of the tested application and the multiple applications.

With reference to the second aspect or the first possible implementation manner of the second aspect, in a second possible implementation manner, the terminal further includes: a first overall test unit, configured to: set the heartbeat periods of the multiple applications to T2 if the first heartbeat test is passed, and perform a first overall heartbeat test, where the second test unit is further configured to: set the heartbeat period of the tested application to T3 if the first overall heartbeat test is passed, and perform the second heartbeat test.

With reference to the second aspect or the first possible implementation manner of the second aspect, in a second possible implementation manner, the first heartbeat service unit is further configured to: set the heartbeat periods of the multiple applications to T1 if the first overall heartbeat test is not passed, and perform heartbeat services.

With reference to the second aspect or the first to the third possible implementation manners of the second aspect, in a fourth possible implementation manner, the terminal further includes:

a second overall test unit, configured to: set the heartbeat periods of the multiple applications to T3 if the second heartbeat test is passed, and perform a second overall heartbeat test, where the third test unit is further configured to: set the heartbeat period of the tested application to T4 if the second overall heartbeat test is passed, and perform the third heartbeat test.

With reference to the fourth possible implementation manner of the second aspect, in a fifth possible implementation manner, the second heartbeat service unit is further configured to: set the heartbeat periods of the multiple applications to T2 if the second overall heartbeat test is not passed, and perform heartbeat services.

With reference to the second aspect or the first to the fifth possible implementation manners of the second aspect, in a sixth possible implementation manner, $T2=T1+\Delta t$; $T3=T2+\Delta t$; and $T4=T3+\Delta t$, where $\Delta t$ is a time constant.

With reference to the second aspect or the first to the sixth possible implementation manners of the second aspect, in a seventh possible implementation manner, the first heartbeat test includes: periodically sending a heartbeat packet to a tested application server by using T2 as a period to test whether the tested application server normally responds to the heartbeat packet.

With reference to the second to the seventh possible implementation manners of the second aspect, in an eighth possible implementation manner, the first overall heartbeat test includes: periodically sending heartbeat packets to multiple application servers by using T2 as a period to test whether the multiple application servers normally respond to the heartbeat packets.

With reference to the second aspect or the first to the eighth possible implementation manners of the second aspect, in a ninth possible implementation manner, the terminal further includes:

a recording unit, configured to record the heartbeat periods that are of the multiple applications and set in a current network.

According to a third aspect, an embodiment of the present invention further provides another terminal, including: a memory and a processor, where the memory stores program code, and the processor is configured to process the program code to perform the following operations:

set a heartbeat period of a tested application to T2 and perform a first heartbeat test;

set heartbeat periods of multiple applications to T1 if the first heartbeat test is not passed, and perform heartbeat services; or set the heartbeat period of the tested application to T3 if the first heartbeat test is passed, and perform a second heartbeat test; and set the heartbeat periods of the multiple applications to T2 if the second heartbeat test is not passed, and perform heartbeat services; or set the heartbeat period of the tested application to T4 if the second heartbeat test is passed, and perform a third heartbeat test, where $$T1<T2<T3<T4.$$

According to the heartbeat period setting method and the terminal that are provided in the embodiments of the present invention, a tested heartbeat period is gradually extended to detect a heartbeat period threshold. On the premise of ensuring that a heartbeat service is normally performed, a long heartbeat period is selected and set, so that applications perform heartbeat services at a same moment by using a same heartbeat period. Therefore, energy consumption of the terminal and signaling overheads are effectively reduced, and a load on an application server can further be reduced.

DESCRIPTION OF EMBODIMENTS

To make the objectives, technical solutions, and advantages of the embodiments of the present invention clearer, the following further describes the embodiments of the present invention in detail with reference to the accompanying drawings. Apparently, the described embodiments are a part rather than all of the embodiments of the present invention. All other embodiments obtained by a person of ordinary skill in the art based on the embodiments of the present invention without creative efforts shall fall within the protection scope of the embodiments of the present invention.

First, it should be noted that the terminal described in the embodiments of the present invention includes, but is not limited to, a terminal device such as a mobile phone, a tablet computer, or a palmtop computer. A person skilled in the art may learn that all intelligent terminal devices that can run an application program may be applied to the method and the apparatus in the embodiments of the present invention.

After the terminal accesses a routing area of a current network by using a base station, a maximum heartbeat period threshold of an application on the terminal is determined by the routing area of the current network. Different routing areas may have different maximum thresholds, and the terminal cannot learn the maximum threshold of the current routing area. Therefore, when the terminal is switched from one routing area to another routing area, the following steps may be triggered to set a same heartbeat period for multiple applications.

Figure 1:
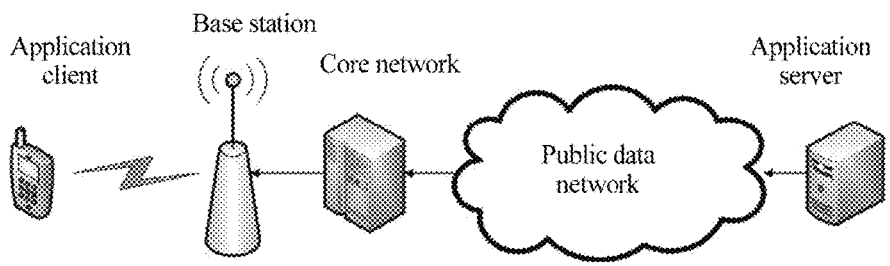
FIG. 1 is a schematic diagram of a network architecture of a heartbeat service according to an embodiment of the present invention.
Figure 2:
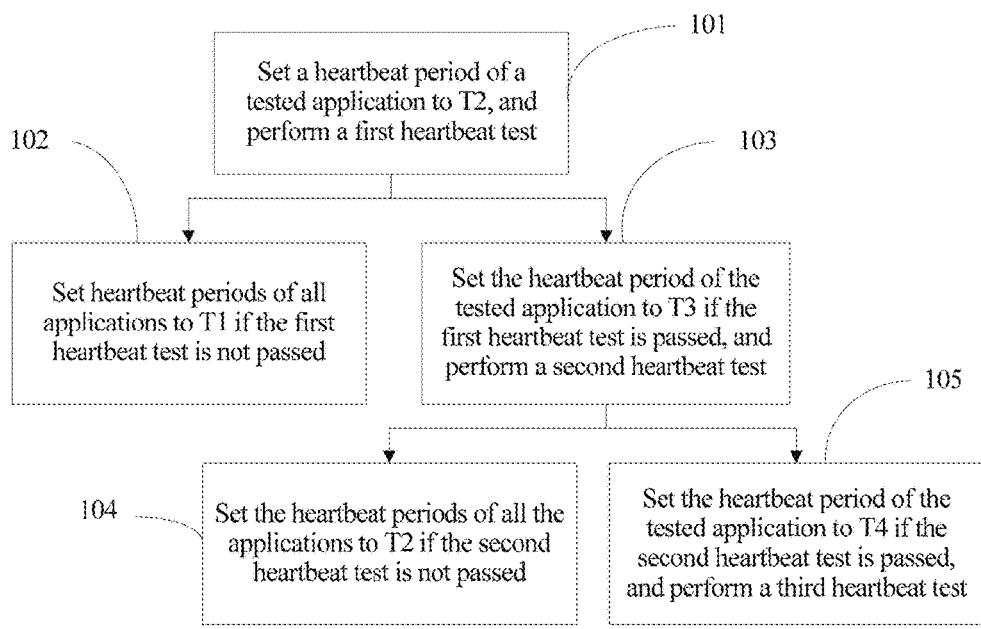
FIG. 2 is a schematic flowchart of a heartbeat period setting method according to an embodiment of the present invention.

As shown in FIG. 2, a heartbeat period setting method provided in an embodiment of the present invention includes the following steps:

Step 101: Set a heartbeat period of a tested application to T2 and perform a first heartbeat test.

Step 102: Set heartbeat periods of multiple applications to T1 if the first heartbeat test is not passed, and perform heartbeat services.

Step 103: Set the heartbeat period of the tested application to T3 if the first heartbeat test is passed, and perform a second heartbeat test.

Step 104: Set the heartbeat periods of the multiple applications to T2 if the second heartbeat test is not passed, and perform heartbeat services.

Step 105: Set the heartbeat period of the tested application to T4 if the second heartbeat test is passed, and perform a third heartbeat test.

$T1<T2<T3<T4.$

T1, T2, T3, and T4 are any heartbeat period values that have a magnitude relationship, for example, 30s and 60s. For example, T1, T2, T3, and T4 may be preset heartbeat periods of applications on a terminal, or may be other heartbeat period values that are randomly selected by a terminal or selected by using another mechanism.

Optionally, if the third heartbeat test is passed, heartbeat periods that are greater than T4, such as T5, T6 , . . . , and Tn, may further be tested until an nth heartbeat test that uses Tn as a heartbeat period is not passed, then T(n−1) is selected and set as the heartbeat periods of the multiple applications, and heartbeat services are performed.

The applications on the terminal originally have different preset heartbeat periods and heartbeat start points. The tested application confirms, by using the heartbeat test, that a specific heartbeat period is safe relative to a maximum threshold of a current core network. Therefore, after the heartbeat period is determined, the applications on the terminal may perform heartbeat services at a same moment by using a same heartbeat period.

It should be noted that the heartbeat test described in all the embodiments of the present invention, which includes the foregoing first heartbeat test, may specifically include: periodically sending, by a baseband processor by using a specific period, a heartbeat packet to an application server corresponding to an application to test whether the application server normally responds to the heartbeat packet. The test may last for one or more periods. The "normally respond" indicates that the application server returns a heartbeat response packet to the terminal in a specific time period. A person skilled in the art may learn that redundancy and failure tolerance may also exist in determining whether the heartbeat packet is normally responded to.

It should be further noted that the tested application in this embodiment of the present invention may be one of the multiple applications installed on the terminal, or may be a simulation application that is specially used to test a heartbeat period threshold of a network, where the application does not implement a substantial service, and therefore, does not have any impact on a substantial service of the terminal when testing a relatively long heartbeat period causes a network disconnection of the tested application and an interruption of the heartbeat service. The "multiple applications" in all the embodiments of the present invention may be all terminal applications that need to perform heartbeat services, or may be some terminal applications that need to perform heartbeat services, which is not limited in the embodiments of the present invention.

According to application of this embodiment of the present invention, a tested heartbeat period of a tested application is gradually extended to detect a heartbeat period threshold of a network. On the premise of ensuring that a heartbeat service is normally performed, a relatively long heartbeat period is selected and set, so that applications perform heartbeat services at a same moment by using a same heartbeat period. Therefore, energy consumption of a terminal and signaling overheads are effectively reduced, and a load on an application server is further reduced.

Figure 3:
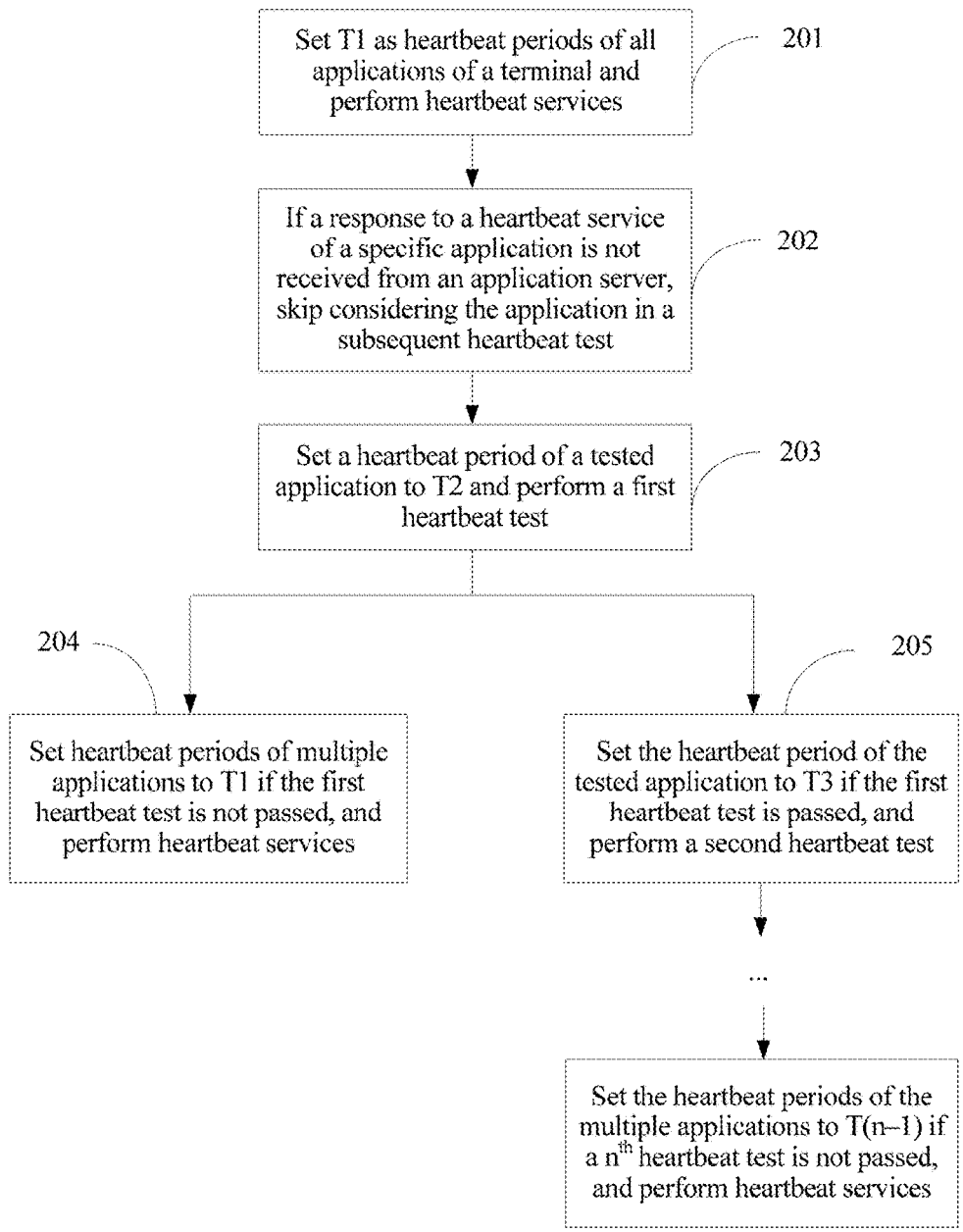
FIG. 3 is a schematic flowchart of another heartbeat period setting method according to an embodiment of the present invention.

With reference to FIG. 3, an embodiment of the present invention further provides another heartbeat period setting method.

A terminal generally includes an application processor and a baseband processor, where the application processor runs an operating system and applications that are on the terminal, and the baseband processor is responsible for a communication function of the terminal and provides the terminal with a communication support at a link layer and at a physical layer. For ease of description, the baseband processor used in this embodiment of the present invention acts as an agent and performs a heartbeat service of an application run by the application processor, so as to maintain a connection between the application and a network-side server without waking up the application processor. A person skilled in the art may learn that this embodiment of the present invention may further be applied to other cases in addition to the case in which the baseband processor acts as an agent and performs the heartbeat service of the application. For example, the application processor controls the heartbeat service of the application by itself.

A basic idea of this embodiment of the present invention is that the baseband processor is responsible for heartbeat services of multiple applications. Each application has a preset heartbeat period, and the preset heartbeat period may be specified by the application server, or may be specified by the application itself, which is not limited in the embodiments of the present invention. Then, the baseband processor ceaselessly extends heartbeat periods of a tested application and other applications to detect a maximum tolerance value of a network to a heartbeat period of an application. If a specific heartbeat service test is not passed, the baseband processor sets, as the heartbeat periods of the multiple applications, a heartbeat period that passes a previous heartbeat service test, and performs heartbeat services. Referring to FIG. 3, this embodiment may specifically include the following steps:

Step 201: Set T1 as heartbeat periods of all applications of a terminal and perform heartbeat services.

T1 is a relatively small heartbeat period, and may be a minimum heartbeat period of all applications, or may be a heartbeat period that is less than a minimum heartbeat period.

Step 202: If a response to a heartbeat service of a specific application is not received from an application server, skip considering the application in a subsequent heartbeat period test. Because T1 is small enough, in a case in which the application server runs normally, the heartbeat service of the application should be normally performed. Therefore, by means of implementation of this step, an application in a case in which the application server is faulty, a service is interrupted, or the like can be removed, so as to improve accuracy of the subsequent heartbeat period test.

Step 203: Set a heartbeat period of a tested application to T2 and perform a first heartbeat test.

The tested application may be one of the multiple applications installed on the terminal. For example, the tested application may be an application that has the minimum preset heartbeat period. In this case, T1 may be the preset heartbeat period of the tested application. Alternatively, the tested application may be a simulation application that is specially used to test a heartbeat period threshold of a network, where the application does not implement any substantial service, and therefore, does not have any impact on a substantial service of the terminal when testing a relatively long heartbeat period, for example, testing T2, causes a network disconnection of the tested application and an interruption of the heartbeat service.

Step 204: Set heartbeat periods of multiple applications to T1 if the first heartbeat test is not passed, and perform heartbeat services.

When the application server cannot normally respond to a heartbeat packet of the tested application, the terminal or the baseband processor considers that the first heartbeat test is not passed. This means that T2 may exceed a heartbeat period threshold of a current core network or a current routing area, the network does not allow the tested application to perform the heartbeat service by using T2 as the heartbeat period, and the terminal is disconnected from the application server. Therefore, T1 that is less than T2 is set as the heartbeat periods of the multiple applications, heartbeat services are performed, and the test ends.

Step 205: Set the heartbeat period of the tested application to T3 if the first heartbeat test is passed, and perform a second heartbeat test.

If the first heartbeat test is passed, T3 that is greater than T2 may further be tried as the heartbeat period, and the second heartbeat test is further performed. By analogy, if an nth heartbeat test is not passed, a heartbeat period that passes a (n−1)th heartbeat test is set as the heartbeat periods of the multiple applications, heartbeat services are performed, and the test ends. Optionally, in all the embodiments of the present invention, a relationship between T1, T2, T3 , . . . , and Tn may be that $T2=T1+\Delta t$, $T3=T2+\Delta t$, . . . , and $Tn+\Delta t$, where $\Delta t$ is a time constant, such as 10s.

Optionally, the terminal may set a maximum period value Tmax for a test. In a testing process, if a heartbeat period Tn of a test is greater than or equal to Tmax, the heartbeat test ends, Tmax or Tn is set as the heartbeat periods of the multiple applications, and heartbeat services are performed.

Figure 4:
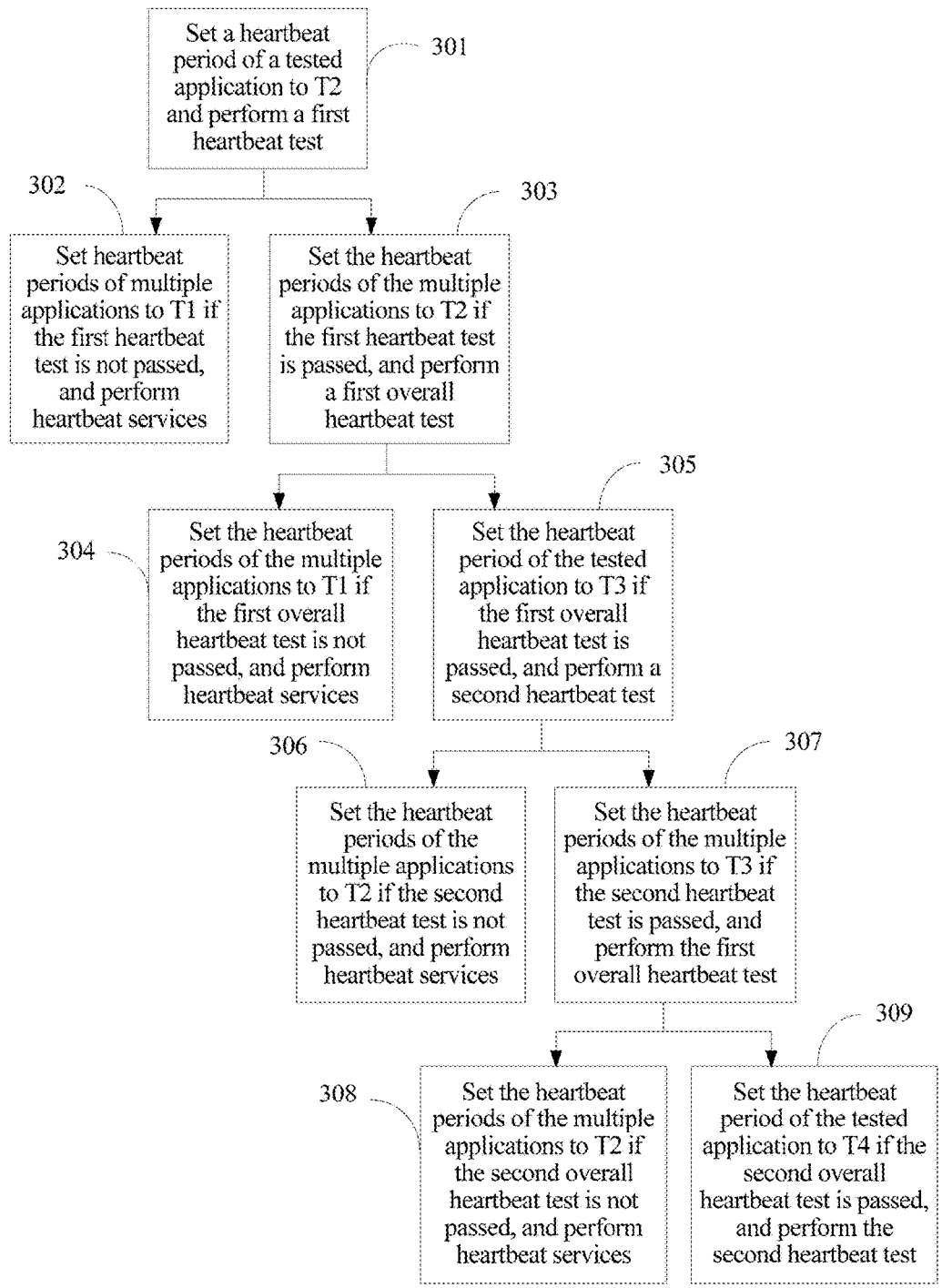
FIG. 4 is a schematic flowchart of another heartbeat period setting method according to an embodiment of the present invention.

In the foregoing embodiment, the tested application is used to perform the heartbeat test. Generally, because the tested application and other applications are limited by a heartbeat period threshold of a same core network or a same routing area, when the tested application passes a heartbeat test by using Tn as a heartbeat period, the other applications should also pass the heartbeat test by using Tn as a heartbeat period. However, a specific application server may also impose a limitation on a heartbeat period of a specific application. In a case that may occur, the heartbeat period Tn that passes the test for the tested application is less than the heartbeat period threshold of the core network or a router, but exceeds a maximum heartbeat period specified by a specific application server, which causes a disconnection of the specific application server from the specific application and an interruption of the heartbeat service. Therefore, optionally, an embodiment of the present invention may include steps in which other applications participate in a heartbeat test. Referring to FIG. 4, this embodiment may include the following steps:

Step 301: Set a heartbeat period of a tested application to T2 and perform a first heartbeat test.

Step 302: Set heartbeat periods of multiple applications to T1 if the first heartbeat test is not passed, and perform heartbeat services.

Step 303: Set the heartbeat periods of the multiple applications to T2 if the first heartbeat test is passed, and perform a first overall heartbeat test.

Step 304: Set the heartbeat periods of the multiple applications to T1 if the first overall heartbeat test is not passed, and perform heartbeat services.

Step 305: Set the heartbeat period of the tested application to T3 if the first overall heartbeat test is passed, and perform a second heartbeat test.

Step 306: Set the heartbeat periods of the multiple applications to T2 if the second heartbeat test is not passed, and perform heartbeat services.

Step 307: Set the heartbeat periods of the multiple applications to T2 if the second heartbeat test is passed, and perform a second overall heartbeat test.

Step 308: Set the heartbeat periods of the multiple applications to T2 if the second overall heartbeat test is not passed, and perform heartbeat services.

Step 309: Set the heartbeat period of the tested application to T3 if the second overall heartbeat test is passed, and perform a third heartbeat test.

The overall heartbeat test described in this embodiment of the present invention, which includes the first and the second overall heartbeat tests, may be specifically: periodically sending, by a baseband processor by using a specific test period, heartbeat packets to multiple application servers respectively corresponding to the multiple applications that are installed and run on the terminal to test whether all the application servers normally respond to the heartbeat packets. The test may last for one or more periods. If any heartbeat packet is not normally responded to, it indicates that a specific application cannot keep a heartbeat service by using the tested heartbeat period, and the test is not passed. The multiple applications in the overall heartbeat test may include the tested application, or may not include the tested application.

If the third heartbeat test is passed, a third overall heartbeat test may continue to be performed. By analogy, if an nth heartbeat test or an nth overall heartbeat test is not passed, a heartbeat period that passes a (n−1)th heartbeat test is set as the heartbeat periods of the multiple applications, heartbeat services are performed, and the test ends.

In this embodiment of the present invention, a heartbeat test is first performed on a tested application, and then an overall heartbeat test is performed on multiple applications, which improves accuracy and safety of setting a same heartbeat period for the multiple applications and further avoids a case in which a directly performed overall heartbeat test may cause a large quantity of interruptions of heartbeat services.

Optionally, in another embodiment, a terminal may further record, in a timely manner, heartbeat periods that are of the multiple applications and set in a current core network or a current routing area. When the terminal subsequently re-accesses the core network or the routing area, the terminal may directly use the heartbeat periods without setting the heartbeat periods of the multiple applications again by using a test.

Figure 5:
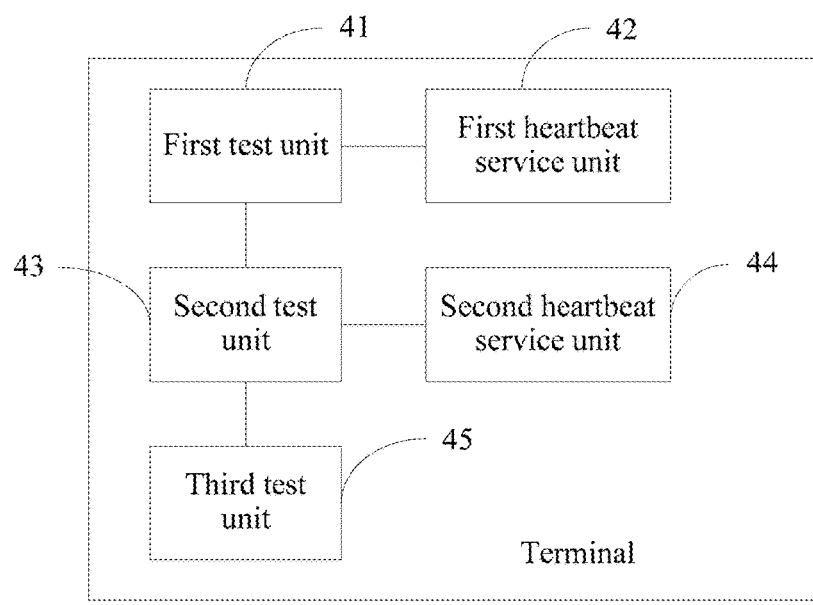
FIG. 5 is a schematic structural diagram of a mobile terminal according to an embodiment of the present invention.

Referring to FIG. 5, an embodiment of the present invention further provides a terminal, including:

a first test unit 41, configured to set a heartbeat period of a tested application to T2 and perform a first heartbeat test;

a first heartbeat service unit 42, configured to: set heartbeat periods of multiple applications to T1 if the first heartbeat test is not passed, and perform heartbeat services;

a second test unit 43, configured to: set the heartbeat period of the tested application to T3 if the first heartbeat test is passed, and perform a second heartbeat test;

a second heartbeat service unit 44, configured to: set the heartbeat periods of the multiple applications to T2 if the second heartbeat test is not passed, and perform heartbeat services; and a third test unit 45, configured to: set the heartbeat period of the tested application to T4 if the second heartbeat test is passed, and perform a third heartbeat test, where $$T1<T2<T3<T4.$$

T1, T2, T3, and T4 are any heartbeat period values that have a magnitude relationship, for example, 30s and 60s. For example, T1, T2, T3, and T4 may be preset heartbeat periods of applications on a terminal, or may be other heartbeat period values that are randomly selected by a terminal or selected by using another mechanism.

Optionally, if the third heartbeat test is passed, heartbeat periods that are greater than T4, such as T5, T6, . . . , and Tn, may further be tested until an nth heartbeat test that uses Tn as a heartbeat period is not passed, then T(n−1) is selected and set as the heartbeat periods of the multiple applications, and heartbeat services are performed.

The applications on the terminal originally have different preset heartbeat periods and heartbeat start points. The tested application confirms, by using the heartbeat test, that a specific heartbeat period is safe relative to a maximum threshold of a current core network. Therefore, after the heartbeat period is determined, the applications on the terminal may perform heartbeat services at a same moment by using a same heartbeat period.

The applications on the terminal originally have different preset heartbeat periods and heartbeat start points. The tested application confirms, by using the heartbeat test, that a specific heartbeat period is safe relative to a maximum threshold of a current core network. Therefore, after the heartbeat period is determined, the applications on the terminal may perform heartbeat services at a same moment by using a same heartbeat period.

According to application of this embodiment of the present invention, a tested heartbeat period of a tested application is gradually extended to detect a heartbeat period threshold of a network. On the premise of ensuring that a heartbeat service is normally performed, a relatively long heartbeat period is selected and set, so that applications perform heartbeat services at a same moment by using a same heartbeat period. Therefore, energy consumption of a terminal and signaling overheads are effectively reduced, and a load on an application server is further reduced.

Optionally, T1 is a minimum heartbeat period of preset heartbeat periods of the tested application and the multiple applications.

Optionally, the terminal may set a maximum period value Tmax for a test. In a testing process, if a heartbeat period Tn of a test is greater than or equal to Tmax, the heartbeat test ends, Tmax or Tn is set as the heartbeat periods of the multiple applications, and heartbeat services are performed.

Figure 6:
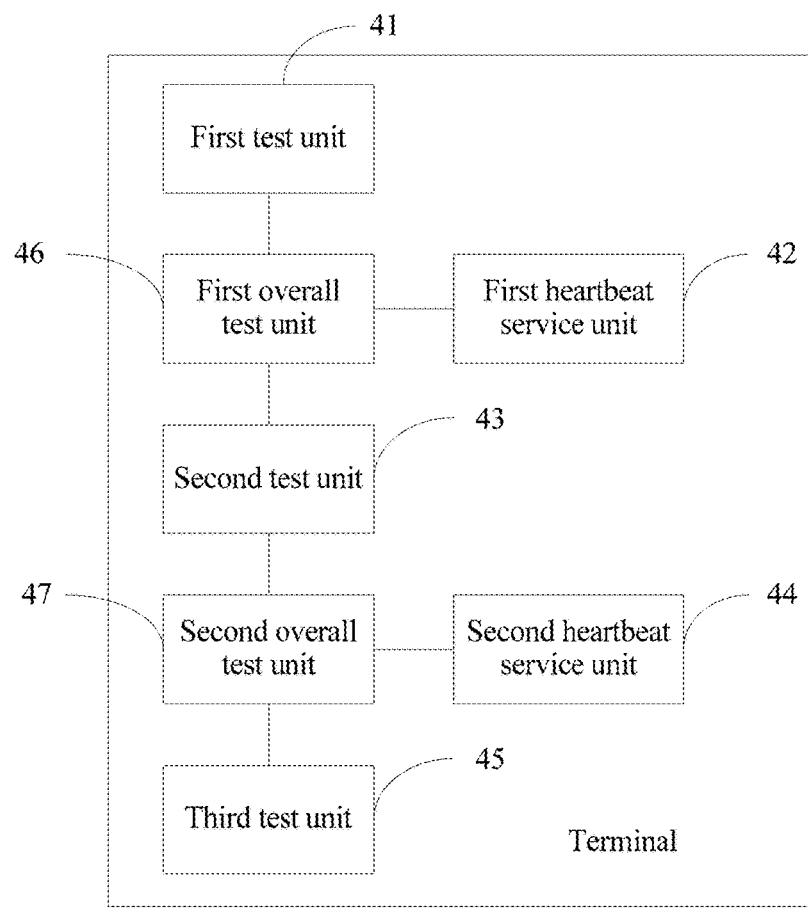
FIG. 6 is a schematic structural diagram of another mobile terminal according to an embodiment of the present invention.

In the foregoing embodiment, the tested application is used to perform the heartbeat test. Generally, because the tested application and other applications are limited by a heartbeat period threshold of a same core network or a same routing area, when the tested application passes a heartbeat test by using Tn as a heartbeat period, the other applications should also pass the heartbeat test by using Tn as a heartbeat period. However, a specific application server may also impose a limitation on a heartbeat period of a specific application. In a case that may occur, the heartbeat period Tn that passes the test for the tested application is less than the heartbeat period threshold of the core network or a router, but exceeds a maximum heartbeat period specified by a specific application server, which causes a disconnection of the specific application server from the specific application and an interruption of the heartbeat service. Therefore, optionally, referring to FIG. 6, the terminal in this embodiment of the present invention further includes: a first overall test unit 46 and a second overall test unit 47.

The first overall test unit 46 is configured to: set the heartbeat periods of the multiple applications to T2 if the first heartbeat test is passed, and perform a first overall heartbeat test.

The second test unit 43 is further configured to: set the heartbeat period of the tested application to T3 if the first overall heartbeat test is passed, and perform the second heartbeat test.

The first heartbeat service unit 42 is further configured to: set the heartbeat periods of the multiple applications to T1 if the first overall heartbeat test is not passed, and perform heartbeat services.

The second overall test unit 47 is configured to: set the heartbeat periods of the multiple applications to T3 if the second heartbeat test is passed, and perform a second overall heartbeat test.

The third test unit 45 is further configured to: set the heartbeat period of the tested application to T4 if the second overall heartbeat test is passed, and perform the third heartbeat test.

The second heartbeat service unit 44 is further configured to: set the heartbeat periods of the multiple applications to T2 if the second overall heartbeat test is not passed, and perform heartbeat services.

The overall heartbeat test described in this embodiment of the present invention, which includes the first and the second overall heartbeat tests, may be specifically: periodically sending, by a baseband processor by using a specific test period, heartbeat packets to multiple application servers respectively corresponding to the multiple applications that are installed and run on the terminal to test whether all the application servers normally respond to the heartbeat packets. The test may last for one or more periods. If any heartbeat packet is not normally responded to, it indicates that a specific application cannot keep a heartbeat service by using the tested heartbeat period, and the test is not passed. The multiple applications in the overall heartbeat test may include the tested application, or may not include the tested application.

In this embodiment of the present invention, a heartbeat test is first performed on a tested application, and then an overall heartbeat test is performed on multiple applications, which improves accuracy and safety of setting a same heartbeat period for the multiple applications and further avoids a case in which a directly performed overall heartbeat test may cause a large quantity of interruptions of heartbeat services.

Figure 7:
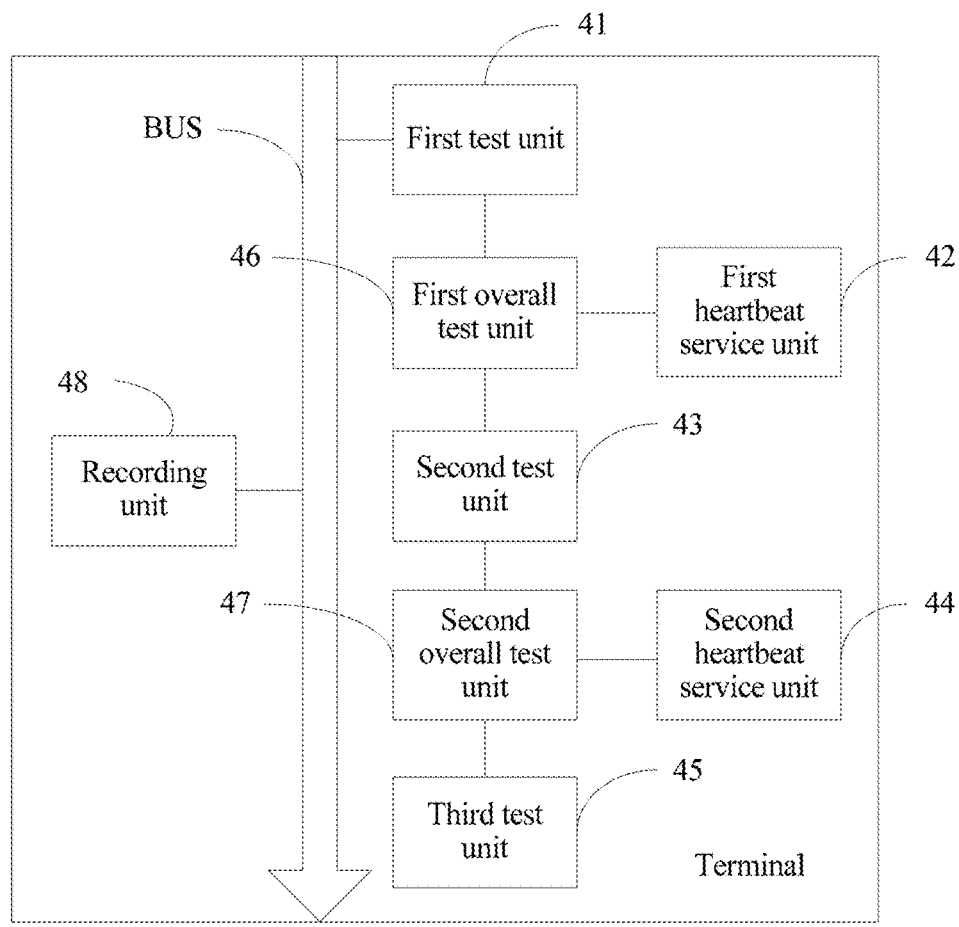
FIG. 7 is a schematic structural diagram of another mobile terminal according to an embodiment of the present invention.
Figure 8:
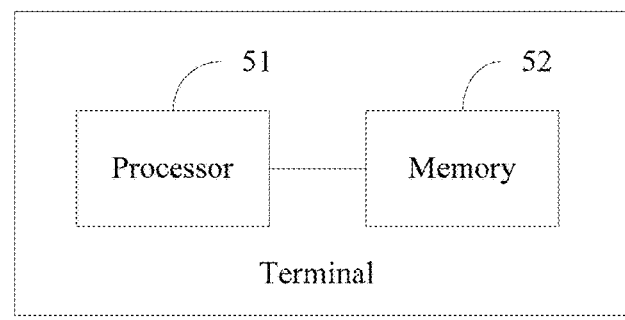
FIG. 8 is a schematic structural diagram of another mobile terminal according to an embodiment of the present invention.

Optionally, referring to FIG. 7, the terminal may further include: a recording unit, configured to record the heartbeat periods that are of the multiple applications and set in a current network, so as to record, in a timely manner, the heartbeat periods that are of the multiple applications and set in the current core network or the current routing area. When the terminal subsequently re-accesses the core network or the routing area, the terminal may directly use the heartbeat periods without setting the heartbeat periods of the multiple applications again by using a test.

It should be noted that units in this embodiment of the present invention is merely divided according to logical functions, and may be divided in other manners in practical implementation. The units may be integrated into one processing unit (such as the baseband processor), or each unit may separately and physically exist, or two or more units are integrated into one unit. The foregoing integrated unit may be implemented in a form of hardware, or may be implemented in a form of hardware and a software functional unit, which is not limited in the embodiments of the present invention.

An embodiment of the present invention further provides another terminal, including: a memory 52 and a processor 51, where the memory 52 stores program code, and the processor 51 is configured to process the program code to perform the following operations:

set a heartbeat period of a tested application to T2 and perform a first heartbeat test;

set heartbeat periods of multiple applications to T1 if the first heartbeat test is not passed, and perform heartbeat services; or set the heartbeat period of the tested application to T3 if the first heartbeat test is passed, and perform a second heartbeat test; and set the heartbeat periods of the multiple applications to T2 if the second heartbeat test is not passed, and perform heartbeat services; or set the heartbeat period of the tested application to T4 if the second heartbeat test is passed, and perform a third heartbeat test, where $T1<T2<T3<T4$.

For other operations corresponding to the program code in this embodiment of the present invention, refer to operation procedures provided in the foregoing method embodiments. A people skilled in the art may learn how to implement the foregoing operations in a form of software program code, and details are not described herein.

The memory 52 in this embodiment of the present invention may be a dedicated memory, or may be a part of storage space in a mass memory, or may be an external memory connected to a core network management entity, such as a secure digital (Security Digital, SD) memory card.

In the foregoing embodiments, the descriptions of all embodiments have respective focuses. For a part that is not described in detail in an embodiment, refer to related descriptions in other embodiments.

A person skilled in the art may know that the accompanying drawings are merely schematic diagrams of embodiments, and modules, entities, or processes in the accompanying drawings are not necessarily required for implementing the embodiments of the present invention.

Based on the foregoing descriptions of the implementation manners, a person skilled in the art may clearly know that the embodiments of the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing embodiments are merely intended for describing the technical solutions of the embodiments of the present invention, but not for limiting the embodiments of the present invention. Although the embodiments of the present invention is described in detail with reference to the foregoing embodiments, persons of ordinary skill in the art should know that they may still make modifications to the technical solutions described in the foregoing embodiments or make equivalent replacements to some technical features thereof, without departing from the scope of the technical solutions of the embodiments of the present invention.

What is claimed is:

1. A heartbeat period setting method comprising:
    setting, by a terminal device, a heartbeat period of a tested application to a time period T2, wherein multiple applications and the tested application are installed in the terminal device;
    performing, by the terminal device, a first heartbeat test by using the time period T2 as the heartbeat period;
    determining, by the terminal device, whether the first heartbeat test has passed;

setting, by the terminal device, heartbeat periods of multiple applications to a time period T1 if the first heartbeat test has not passed, and then performing, by the terminal device, heartbeat services by using the time period T1 as the heartbeat period, wherein the time period T1 is less than the time period T2, and the time period T1 is a minimum heartbeat period of preset heartbeat periods of the tested application and the multiple applications;

setting, by the terminal device, the heartbeat period of the tested application to a time period T3 if the first heartbeat test has passed, and then performing, by the terminal device, a second heartbeat test by using the time period T3 as the heartbeat period, wherein T2 is less than T3;

determining, by the terminal device, whether the second heartbeat test is passed;

setting, by the terminal device, the heartbeat periods of the multiple applications to the time period T2 if the second heartbeat test has not passed, and then performing, by the terminal device, heartbeat services by using the time period T2 as the heartbeat period; and setting, by the terminal device, the heartbeat period of the tested application to a time period T4 if the second heartbeat test is passed, and then performing, by the terminal device, a third heartbeat test by using the time period T4 as the heartbeat period, wherein T3 is less than T4.

2. The method according to claim 1, wherein $$T2=T1+\Delta t;$$

$$T3=T2+\Delta t; \text{ and}$$

$$T4=T3+\Delta t,$$

wherein $\Delta t$ is a time constant.

3. The method according to claim 2, wherein the method further comprises recording the heartbeat periods that are of the multiple applications.

4. The method according to claim 1, wherein the first, second or third heartbeat test comprises periodically sending, by the terminal device, a heartbeat packet to an application server corresponding to an application to test whether the application server normally responds to the heartbeat packet by using time periods T2, T3 or T4, respectively.

5. The method according to claim 4, wherein the tested application is one of the following:
one of the multiple applications that has the minimum preset heartbeat period installed on the terminal, or
a simulation application that is for testing a heartbeat period threshold of a network, and the application does not implement any other substantial service.

6. A heartbeat period setting method comprising:
setting, by a terminal device, a heartbeat period of a tested application to a time period T2, wherein multiple applications and the tested application are installed in the terminal device;
performing, by the terminal device, a first heartbeat test by using the time period T2 as the heartbeat period;
determining, by the terminal device, whether the first heartbeat test is passed;
setting, by terminal device, the heartbeat periods of multiple applications to a time period T1 if the first heartbeat test has not passed, and performing by the terminal device, heartbeat services by using the time period T1 as the heartbeat period, wherein the time period T1 is less than the time period T2, and the time period T1 is a minimum heartbeat period of preset heartbeat periods of the tested application and the multiple applications;

setting, by terminal device, the heartbeat periods of the multiple applications to the time period T2 if the first heartbeat test has passed, and then performing, by the terminal device, a first overall heartbeat test by using the time period T2 as the heartbeat period;

determining, by the terminal device, whether the first overall heartbeat test has passed;

setting, by the terminal device, the heartbeat periods of the multiple applications to the time period T1 if the first overall heartbeat test has not passed, and then performing, by the terminal device, heartbeat services by using T1 as the heartbeat period;

setting, by the terminal device, the heartbeat period of the tested application to a time period T3 if the first overall heartbeat test has passed, and then performing, by the terminal, a second heartbeat test by using the time period T3 as the heartbeat period;

determining, by the terminal device, whether the second heartbeat test has passed;

setting, by the terminal device, the heartbeat periods of the multiple applications to the time period T2 if the second heartbeat test has not passed, and then performing, by the terminal, heartbeat services by using the time period T2 as the heartbeat period;

setting, by the terminal device, the heartbeat periods of the multiple applications to the time period T2 if the second heartbeat test has passed, and then performing, by the terminal device, a second overall heartbeat test by using the time period T2 as the heartbeat period;

determining, by the terminal device, whether the second overall heartbeat test is passed;

setting, by the terminal device, the heartbeat periods of the multiple applications to the time period T2 if the second overall heartbeat test has not passed, and then performing, by the terminal device, heartbeat services by using the time period T2 as the heartbeat period; and setting, by the terminal device, the heartbeat period of the tested application to the time period T3 if the second overall heartbeat test is passed, and then performing, by the terminal device, a third heartbeat test by using a time period T4 as the heartbeat period.

7. The method according to claim 6, wherein $$T2=T1+\Delta t;$$

$$T3=T2+\Delta t; \text{ and}$$

$$T4=T3+\Delta t,$$

wherein $\Delta t$ is a time constant.

8. The method according to claim 7, wherein the first, second or third heartbeat test comprises periodically sending, by the terminal device, a heartbeat packet to an application server corresponding to an application to test whether the application server normally responds to the heartbeat packet by using the time periods T2, T3 or T4, respectively.

9. The method according to claim 6, wherein the method further comprises recording the heartbeat periods of the multiple applications.

10. The method according to claim 9, wherein the tested application is one of the following:
one of the multiple applications that has the minimum preset heartbeat period installed on the terminal, or
a simulation application for testing a heartbeat period threshold of a network, and the application does not implement any other service.

11. A terminal device comprising:
one or more processors; and
a memory storing one or more programs and a first software application, wherein the one or more programs are configured to be executed by the one or more processors, the one or more programs including instructions for:
  setting, by the terminal device, a heartbeat period of a tested application to a time period T2, wherein multiple applications and the tested application are installed in the terminal device;
  performing, by the terminal device, a first heartbeat test by using a time period T2 as the heartbeat period;
  determining, by the terminal device, whether the first heartbeat test has passed;
  setting, by the terminal device, heartbeat periods of multiple applications to a time period T1 if the first heartbeat test is not passed, and then performing, by the terminal device, heartbeat services by using the time period T1 as the heartbeat period,
    wherein the time period T1 is less than the time period T2, and the time period T1 is a minimum heartbeat period of preset heartbeat periods of the tested application and the multiple applications;
  setting, by the terminal device, the heartbeat period of the tested application to a time period T3 if the first heartbeat test has passed, and then performing, by the terminal device, a second heartbeat test by using the time period T3 as the heartbeat period, wherein the time period T2 is less than the time period T3;
  determining, by the terminal device, whether the second heartbeat test is passed;
  setting, by the terminal device, the heartbeat periods of the multiple applications to the time period T2 if the second heartbeat test is not passed, and then performing, by the terminal device, heartbeat services by using the time period T2 as the heartbeat period; and
  setting, by the terminal device, the heartbeat period of the tested application to a time period T4 if the second heartbeat test is passed, and then performing, by the terminal device, a third heartbeat test by using the time period T4 as the heartbeat period, wherein the time period T3 is less than the time period T4.

12. The terminal device according to claim 11, wherein $T2=T1+\Delta t;$ $T3=T2+\Delta t;$ and $T4=T3+\Delta t,$ wherein $\Delta t$ is a time constant.

13. The terminal device according to claim 11, wherein the instructions further comprise recording the heartbeat periods of the multiple applications.

14. The terminal device according to claim 11, wherein the first, second or third heartbeat test comprises periodically sending, by the terminal device, a heartbeat packet to an application server corresponding to an application to test whether the application server normally responds to the heartbeat packet by using the time period T2, T3 or T4, respectively.

15. The terminal device according to claim 11, wherein the tested application is one of the following:
  one of the multiple applications that has the minimum preset heartbeat period installed on the terminal, or
  the tested application a simulation application for testing a heartbeat period threshold of a network, and the application does not implement any other substantial service.

* * * * *